(12) United States Patent
Guo et al.

(10) Patent No.: US 7,707,181 B2
(45) Date of Patent: Apr. 27, 2010

(54) SYSTEM AND METHOD OF DISTRIBUTING REPLICATION COMMANDS

(75) Inventors: Qun Guo, Redmond, WA (US); Michael E. Habben, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 583 days.

(21) Appl. No.: 10/370,389

(22) Filed: Feb. 19, 2003

(65) Prior Publication Data
US 2004/0162859 A1    Aug. 19, 2004

(51) Int. Cl.
*G06F 17/30*    (2006.01)
(52) U.S. Cl. .................................... 707/636; 714/20
(58) Field of Classification Search ......... 707/200–204; 714/2, 16
See application file for complete search history.

(56) References Cited

U.S. PATENT DOCUMENTS

| | | | | |
|---|---|---|---|---|
| 4,648,031 A * | 3/1987 | Jenner | ......................... | 714/10 |
| 4,949,251 A * | 8/1990 | Griffin et al. | ................... | 714/20 |
| 5,452,445 A * | 9/1995 | Hallmark et al. | ................ | 707/2 |
| 5,701,480 A * | 12/1997 | Raz | ............................ | 718/101 |
| 5,781,910 A * | 7/1998 | Gostanian et al. | ........... | 707/201 |
| 5,799,305 A * | 8/1998 | Bortvedt et al. | ................ | 707/10 |
| 6,144,983 A * | 11/2000 | Klots et al. | ................... | 718/104 |
| 6,243,702 B1 * | 6/2001 | Bamford et al. | ................. | 707/8 |
| 6,438,558 B1 * | 8/2002 | Stegelmann | ................. | 707/102 |
| 6,463,532 B1 * | 10/2002 | Reuter et al. | ................. | 709/224 |
| 6,510,421 B1 * | 1/2003 | Ganesh et al. | ................. | 707/1 |
| 6,658,540 B1 * | 12/2003 | Sicola et al. | ................. | 711/162 |
| 6,718,361 B1 * | 4/2004 | Basani et al. | ................ | 709/201 |
| 6,782,398 B1 * | 8/2004 | Bahl | .......................... | 707/200 |
| 7,181,642 B1 * | 2/2007 | Heideman et al. | .............. | 714/6 |
| 7,406,486 B1 * | 7/2008 | Kundu et al. | ................. | 707/201 |
| 2002/0165724 A1 | 11/2002 | Blankesteijn | ................. | 705/1 |

FOREIGN PATENT DOCUMENTS

WO    WO 01/77841 A3    10/2001

OTHER PUBLICATIONS

Ancilotti et al. A Distributed Commit Protocol for a Multi Computer System. IEEE Transactions on Computers, vol. 39, No. 5. May 1990.*

Garcia, "Microsoft SQL Server 2000 Official Manual", vol. 2, 1st Edition, NikkeiBPSoftPress, Inc., Kohei Okamura, Mar. 19, 2001, 21-120.

Japanese Application No. 2004-043508 (MSFT-3059) English Translation of Notice of Rejection mailed on Nov. 13, 2009, 2 pages.

* cited by examiner

*Primary Examiner*—John R. Cottingham
*Assistant Examiner*—Robert Timblin
(74) *Attorney, Agent, or Firm*—Woodcock Washburn LLP

(57) ABSTRACT

A transactional replication system wherein each replicated command applies to a single row as identified by the primary key, replicated commands are dispatched among multiple connections by hashing of primary key from a single command queue to ensure that changes to the same data row are always dispatched to the same connection to maintain the order of commands as originally occurred on publisher. All connections commit their transactions at the same time in a coordinated fashion without a two phase commit. Retry logic based on a logical sequence number is used to reapply commands from any connection that fails to commit.

13 Claims, 3 Drawing Sheets

SYSTEM AND METHOD OF DISTRIBUTING REPLICATION COMMANDS

FIELD OF THE INVENTION

The present invention relates to the field of computing and, in particular, to the field of transactional replication.

BACKGROUND OF THE INVENTION

Replication is the capability to copy data and changes to that data from one database to another. FIG. 1 illustrates an overview of conventional transactional replication. A Publisher 200 is a server or database that sends its data to another server or database. The Publisher 200 may contain publication/publications that are a collection of one or more articles that are sent to a subscriber server or database. In transactional replication, an article is what is to be replicated, and may be an entire table, select rows from a table, specified columns from a table or a stored procedure.

A Distributor 202 manages the flow of data through the replication system. The distributor 202 contains a distribution database that tracks the changes (to publications) that need to be replicated from publishers 200. A publisher 200 may act as its own distributor 202, or a remote database server can be used to hold the distribution database.

A Subscriber(s) 204 is a server or database that receives data from the publisher 200 or other database. A subscription is the group of data that a server or database 204 will receive. This can be one or more publications. There are push and pull subscriptions. A push subscription is subscription when the publishing server will periodically push transactions out to the subscribing server or database. A pull subscription is subscription when the subscribing server will periodically connect to the distribution database and pull information.

In conventional transactional replication, replicated commands are typically applied through a single connection 203 at the subscriber, as shown in FIG. 1. While a single connection ensures the transactions will be applied at the subscriber in the exact order as the transactions occur on the publisher, there are performance losses with this method, especially when requests are from a heavily loaded publisher.

In addition, conventional replication technique utilizes triggers when an insert, update, or delete operation occurs, to keep track of changes made to published table. This adds additional overhead to Publisher 200 because of the triggers. Thus, there is a need for increasing the performance of transactional replication systems, while reducing overhead costs and ensuring that transactions are properly applied at the subscriber. The present invention provides such a solution.

SUMMARY OF THE INVENTION

The present invention advantageously overcomes the limitations of the prior art by utilizing multiple transactions queues in the distribution process when applying replication commands. In accordance with an aspect of the invention, there is provided a system for distributing replication commands. The system includes a distributor having a command queue that receives replication commands from a publisher. The distributor has multiple connections to communicate the replication commands to subscribers. A plurality of command buckets receive the commands from the distributor. Each of the command buckets communicates to the distributor via one of the multiple connections and receives only those replication commands with the same hash key The received replication commands each containing an identifier of an unique row.

In accordance with a feature of the system, the publisher decorates each of the replication commands with a hash of the primary key of the row of a table to be operated upon. The replication commands are sorted into a respective command bucket in accordance with the hash of the primary key.

In accordance with a further feature, the distributor marks each bucket ready for a commit, and the replication commands in each bucket are applied to the subscriber at substantially the same time. An executor of each bucket notifies the distributor that the commit has been completed such that the distributor resumes processing.

In accordance with another feature, a retry mechanism is employed to determine if each of the connections has successfully committed. If a connection has failed to commit, the retry mechanism restarts the commit process from an earliest failed point in accordance with a logical sequence number of the replication commands, and applies the replication commands having newer logical sequence numbers than a last logical sequence number of a replication command to successfully commit.

In accordance with another aspect of the invention, there is provided a method for distributing replication commands in a system having a subscriber, distributor and publisher. The method includes decorating replication commands at the publisher with a unique identifier of a row on which the replication commands are to be operated upon; forwarding the replication commands to the distributor; storing the replication commands in a command queue; and forwarding the replication commands to a plurality of command buckets, each of the plurality of command buckets having a connection to the distributor. Each command bucket receives replication commands to be applied to a unique row of a table of the subscribers in accordance with the unique identifier of the unique row.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
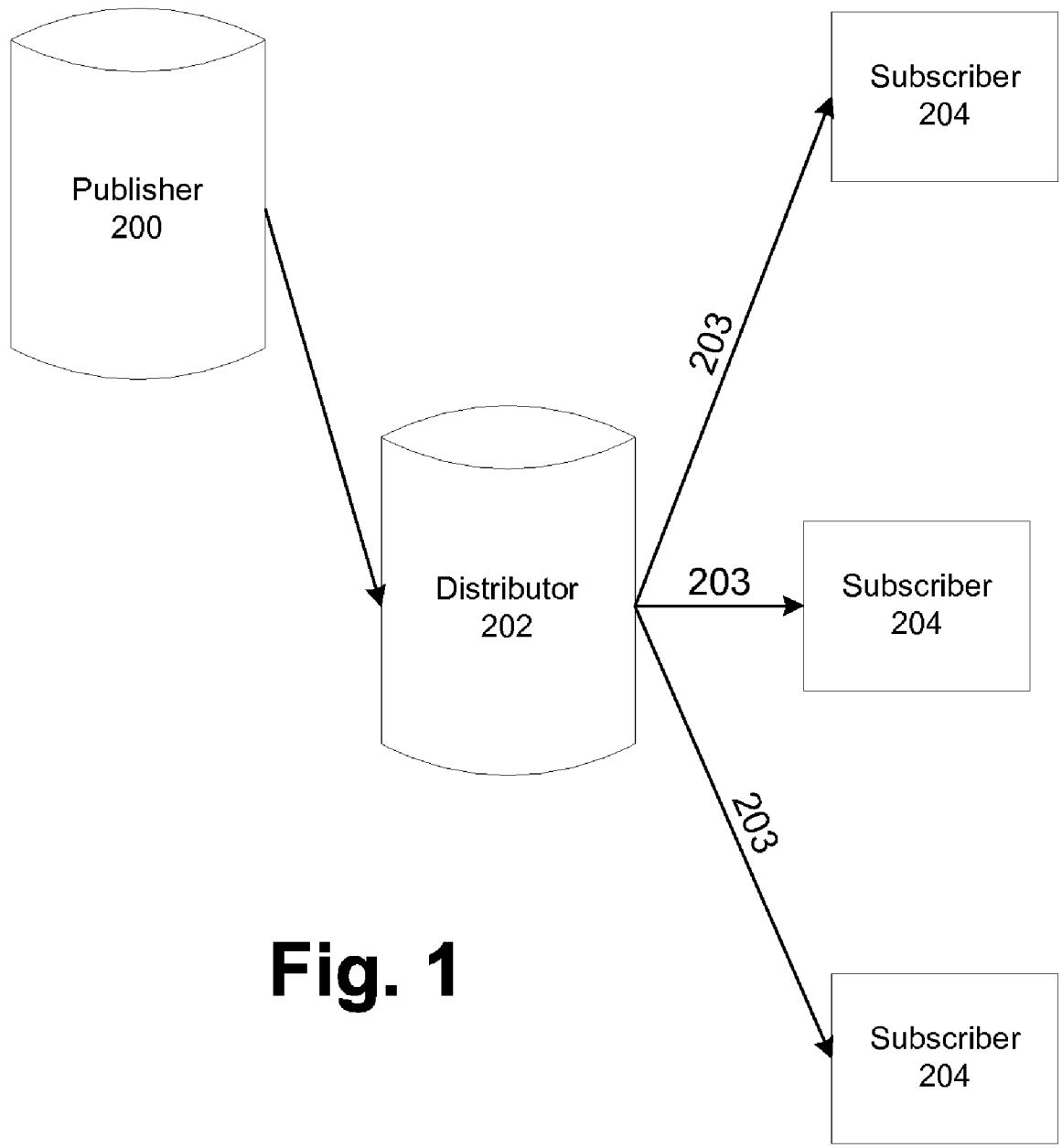
FIG. 1 illustrates the topology of a conventional transactional replication system.
Figure 2:
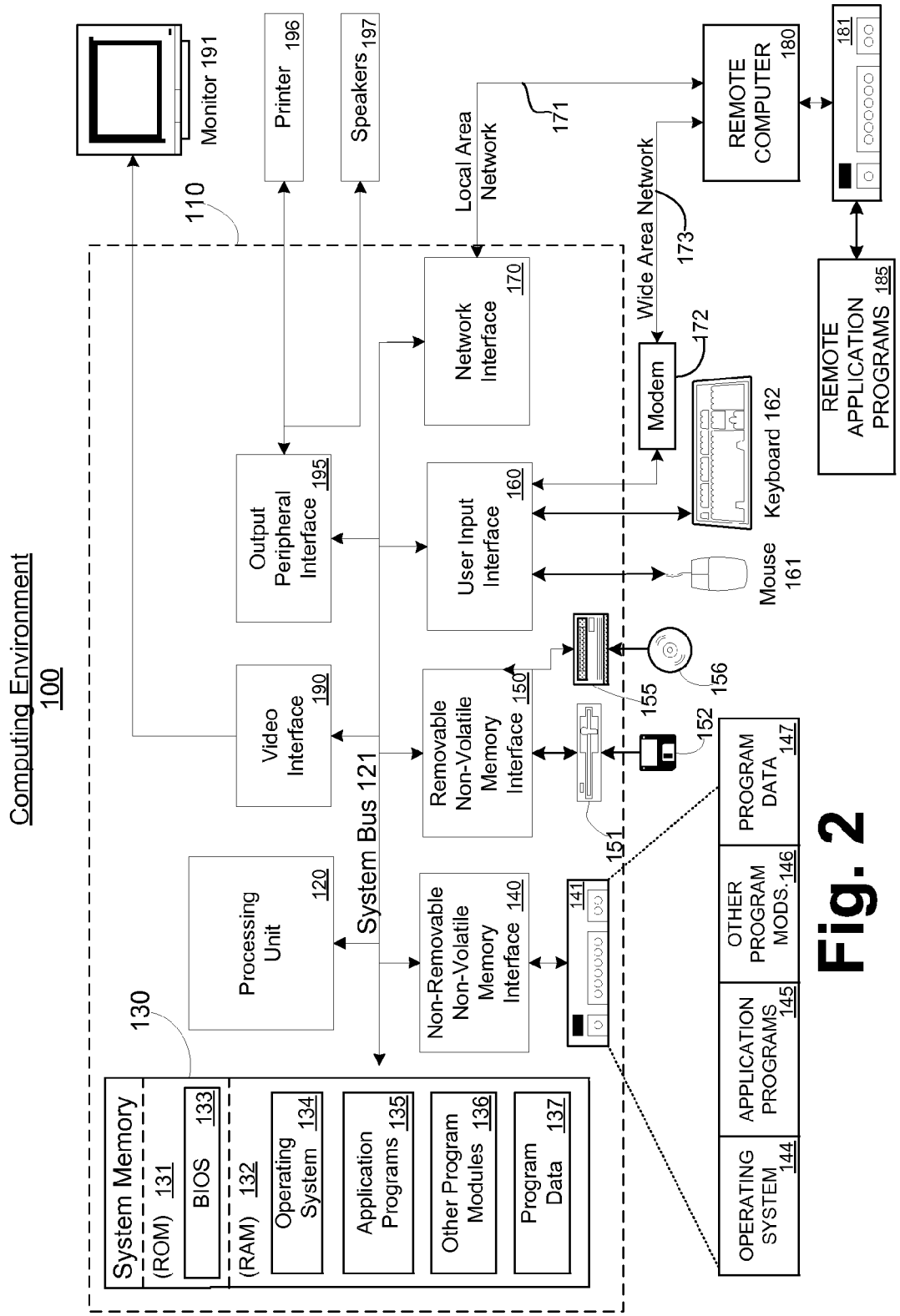
FIG. 2 illustrates an exemplary computing environment in which the present invention may be embodied.

FIG. 2 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Exemplary Embodiments of the Transactional Replication of the Present Invention

Figure 3:
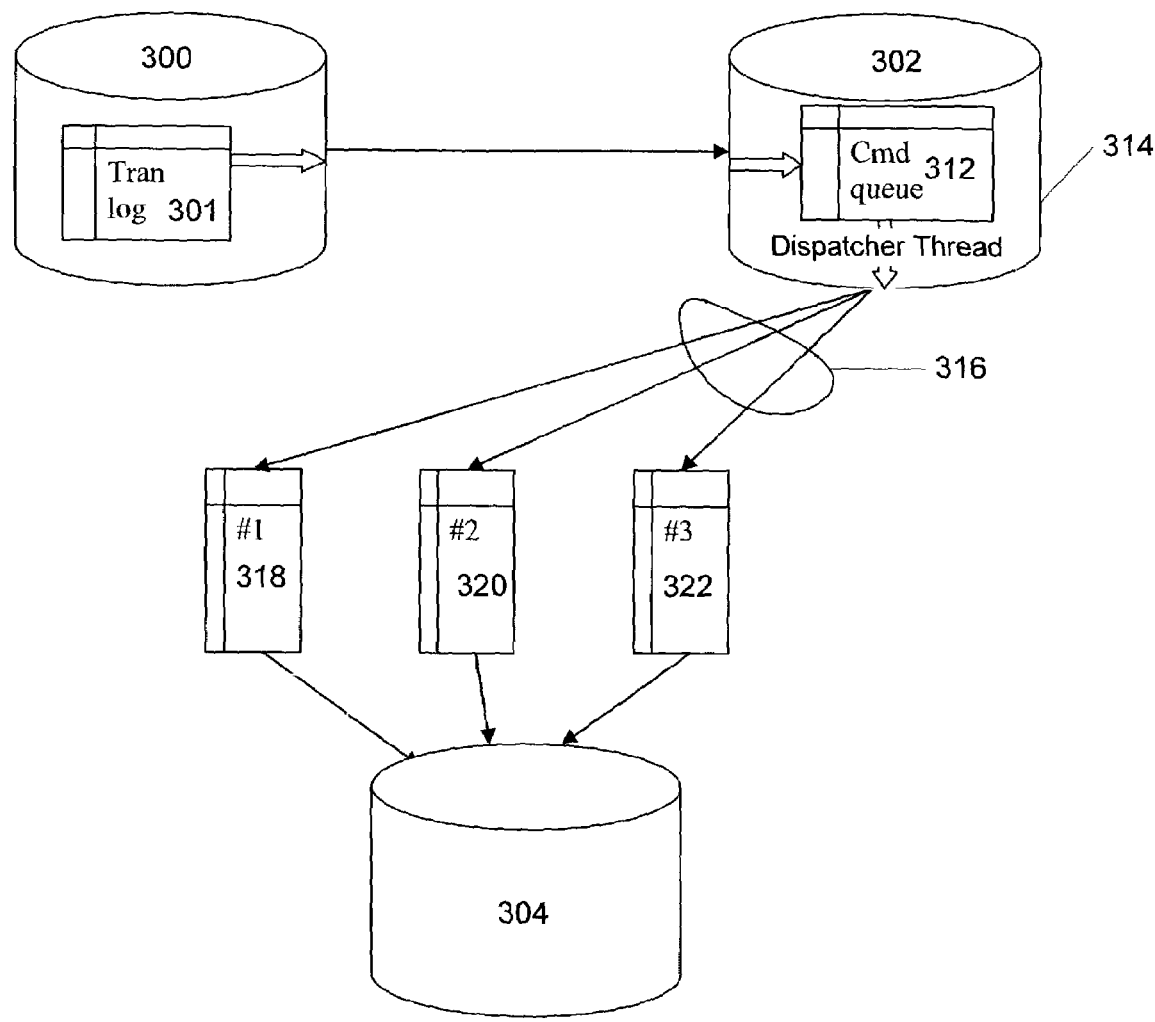
FIG. 3 illustrates an exemplary topology of the transactional replication system of the present invention.

FIG. 3 illustrates the topology of the transactional replication system in greater detail. The present invention advantageously overcomes the limitations of the prior art by utilizing multiple transaction queues at the subscribers to apply replication commands. A publisher 300 decorates each command (i.e., update, delete, insert, etc.) to be replicated in a transaction log 301 with a hash of the primary key of the row to which the command is being applied. As is known in the art, the transaction log 301 retains a list of all commands such that a rollback can be applied to a database to undo changes.

The decorated commands are forwarded by the publisher 300 to a distributor 302 that stores the command in a command queue 312. The command queue 312 stores the commands for forwarding to subscribers, as described below. A dispatcher thread 314 reads and sorts the command queue 312 based on the primary key hashed with each command, and sends the commands for a single row via one of connections 316 to a unique bucket 318, 320 or 322 associated with that particular row. The present invention is not limited to three connections 316 and three buckets, as any number of connections and buckets may be utilized. For example, all commands applied to row 1 are delivered to bucket 318 via its respective connection, row 2 to bucket 320 via its respective connection, etc. Hashing by the primary key at the publisher 300 ensures that each replicated command applies to a single row and that the commands for that data row are delivered to the appropriate bucket 318, 320 or 322. Further, this ensures that the order of commands in the buckets 318, 320 and 322 are maintained in the order as they originally occurred on publisher 300.

The multiple connections 316 perform a "coordinated commit" in accordance with the present invention to ensure transactional consistency at the end of each successful batch as follows. The dispatcher thread 314 marks each the buckets 318, 320, 322 as ready for commit and ceases sending additional commands to the command buckets. An executor thread running on each bucket is marked for commit upon receipt of the commit command and reads from its associated command bucket and applies changes to a subscriber. In accordance with the present invention, all executors to commit at substantially the same time to apply the commands to their respective rows. The dispatcher thread 314 waits for a event from the executors that signals the completion of the commit process so it can resume its normal processing.

The coordinated commit process advantageously avoids the communication and logging overhead associated with the two phase commit operation where a write and prepare step is necessary prior to the commit. While this feature is optimized for high performance distribution, it may comprise transactional consistency because there is no prepare and commit stage offered by the conventional two phase commit. As such, committed executors may not be rolled back if any executor fails to commit. To ensure consistency, the present invention implements a retry logic which handles mixture of successful and un-successful committed connections is contemplated herein. In accordance with the present invention, replicated commands in the serialized command queue 312 are sorted by a Logical Sequence Number (LSN) of commit record. Because the commands then are dispatched to multiple connections based on hash value of primary key, commands in the same transaction may arrive at the subscriber 304 via different connections 316.

If a particular connection fails to commit, the retry logic restarts from the earliest failed point, refetches the command queue 312, and identifies which commands have been applied successfully by the committed transaction and which commands need to be reapplied. To perform this feature, the present invention tracks the last committed LSN for all connections, restarts from the earliest committed command, and checks the LSN of each command against the last LSN committed in the connection (identified by the hash value). Only those command having LSNs newer than associated last LSN are reapplied. This approach advantageously ensures that at the end of a successful batch, a subscriber is at transactional consistent state.

Thus, as can now be recognized by one of ordinary skill in the art from the above description, distributing the commands among multiple connections serves to increase performance without compromising transactional consistency at the end subscriber.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A system for distributing replication commands from a distributor to a subscriber, the system comprising:
   a memory;
   a distributor for execution on a first computer in a network including a plurality of computers, the distributor comprising:
   a command queue that receives transactional replication commands from a publisher and stores the transactional replication commands in the memory, wherein each replication command corresponds to a change in data in a data row and is associated with a respective hash of a primary key of the data row to which the replication command is associated;
   a plurality of command buckets, wherein each of the plurality of command buckets is associated with a respective connection to the command queue and only one data row, and wherein at least a portion of a communication and logging overhead associated with a two phase commit operation is avoided by including for each of the plurality of command buckets an executor that executes a coordinated commit operation upon the plurality of command buckets at substantially the same time;
   a dispatcher, wherein the dispatcher:
   sorts the transactional replication commands stored in the command queue as a function of each hash associated with a transactional replication command, and by applying a logical sequence number of commit record in order to identify which commands amongst the transactional replication commands of the command queue need to be re-applied as a result of an unsuccessful commit operation;
   transmits each transactional replication command in the command queue to an associated command bucket as a function of the hash associated with the transactional replication command using the respective connection for the associated command bucket such that each command bucket stores a respective set of replication commands having a same hash value;
   marks each of the command buckets as ready to be committed;
   stops sending new transactional replication commands to the marked command buckets; and
   waits to receive from each executor, an event that signals a successful completion of the coordinated commit operation, thereby detecting a mixture of successful and unsuccessful commit operations amongst the plurality of command buckets.

2. The system of claim 1, wherein as part of the coordinated commit operation, at substantially the same time, each executor reads from its associated command bucket and applies changes as a function of the reads from the associated command bucket to the subscriber over a plurality of connections.

3. The system of claim 2, wherein each executor is a thread running on a respective command bucket.

4. The system of claim 1, further comprising a retry mechanism.

5. The system of claim 4, wherein the retry mechanism identifies which commands have been committed successfully, and reapplies only the replication commands having newer logical sequence numbers than a last logical sequence number of a replication command to successfully commit.

6. A method for distributing transactional replication commands in a system having at least one of a distributor or a publisher on a first computer and a subscriber on a second computer, the method comprising:
   receiving each transactional replication command and a respective associated indicia for each replication command from the publisher; wherein each received replication command correspond to a change in a respective data row of a table, and wherein each indicia is a hash of a primary key of a respective row of the table on which the replication command operates;
   storing the replication commands and the indicia in a command queue;
   sorting the transactional replication commands stored in the command queue using a logical sequence number of commit record;
   transmitting each transactional replication command in the command queue to an associated command bucket as a function of the associated indicia via a respective dedicated connection to the associated command bucket such that each command bucket stores a respective set of replication commands having a same hash value, wherein each command bucket is associated with a respective connection to the command queue and only one data row;
   marking each of the command buckets as ready to be committed;

stopping new transactional replication commands from being sent to the marked command buckets;

avoiding incurring at least a portion of a communication and logging overhead associated with a two phase commit operation by executing a coordinated commit operation at substantially the same time;

waiting to receive from an executor associated with a command bucket, an event that signals a successful completion of the coordinated commit operation, thereby detecting a mixture of successful and unsuccessful commit operations; and using the logical sequence number of commit record in order to identify which commands amongst the transactional replication commands of the command queue need to be re-applied as a result of an unsuccessful commit operation.

7. The method of claim 6, wherein executing the coordinated commit operation comprises reading each set of replication commands from each command bucket and applying changes to the subscriber based upon each replication command in the set, over a plurality of connections.

8. The method of claim 6, further comprising:
determining if the replication commands of each bucket have committed successfully at the subscriber.

9. The method of claim 8, further comprising:
restarting the commit process from an earliest failed point in accordance with the logical sequence number of commit record; and applying only the replication commands having newer logical sequence numbers than a last logical sequence number of a replication command to successfully commit.

10. A computer-readable storage medium having computer-executable instructions for distributing transaction replication commands from a publisher to a subscriber, said instructions comprising:

receiving each transactional replication command and a respective associated indicia for each replication command from the publisher; wherein each received replication command corresponds to a change in a respective data row of a table, and wherein each indicia is a hash of a primary key of a respective row of the table on which the replication command operates;

storing the replication commands and the indicia in a command queue;

sorting the transactional replication commands stored in the command queue using a logical sequence number of commit record;

transmitting each transactional replication command in the command queue to an associated command bucket as a function of the associated indicia via a respective dedicated connection to the associated command bucket such that each command bucket stores a respective set of replication commands having a same hash value, wherein each command bucket is associated with a respective connection to the command queue and only one data row;

marking each of the command buckets as ready to be committed;

stopping new transactional replication commands from being sent to the marked command buckets;

executing a coordinated commit operation at substantially the same time, thereby avoiding incurring at least a portion of a communication and logging overhead associated with a two phase commit operation;

waiting to receive from an executor associated with a command bucket, an event that signals a successful completion of the coordinated commit operation, thereby detecting a mixture of successful and unsuccessful commit operations; and using the logical sequence number of commit record in order to identify which commands amongst the transactional replication commands of the command queue need to be re-applied as a result of an unsuccessful commit operation.

11. The computer-readable storage medium of claim 10, further comprising instructions for reading each set of transaction replication commands from each command bucket and applying changes to the subscriber based upon each transaction replication command in the set.

12. The computer-readable storage medium of claim 10, further comprising instructions for:
determining if the replication commands of each bucket have committed successfully at the subscriber.

13. The computer-readable storage medium of claim 12, further comprising instructions for:
restarting the commit process from an earliest failed point in accordance with the logical sequence number of commit record; and applying only the replication commands having newer logical sequence numbers than a last logical sequence number of a replication command to successfully commit.

* * * * *